United States Patent [19]
Meier et al.

[11] 3,834,322
[45] Sept. 10, 1974

[54] MIXER TYPE CAR FOR TRANSPORTING MOLTEN PIG IRON

[76] Inventors: Günter Meier, Weseler Str. 17, Oberhausen, Germany 42; Winfried Laubach, Nansen Str. 14, Gelsenkirchen, Germany 465; Josef Horstmann, Oskar Str. 82, Oberhausen, Germany 42

[22] Filed: June 25, 1973

[21] Appl. No.: 373,037

[30] Foreign Application Priority Data
June 26, 1972  Germany............................ 2231180

[52] U.S. Cl................................. 105/367, 105/270
[51] Int. Cl............................................. B61d 5/04
[58] Field of Search ........... 105/367, 270, 271, 264, 105/358

[56] References Cited
UNITED STATES PATENTS
2,151,391  3/1939  Pugh.................................... 105/270
3,070,039  12/1962  Mohr.................................... 105/270
3,608,501  9/1971  Marxen et al.................... 105/367 X Primary Examiner—M. Henson Wood, Jr.
Assistant Examiner—Gene A. Church
Attorney, Agent, or Firm—McGlew and Tuttle

[57]  ABSTRACT

A car structure for very large containers such as mixing tanks for transporting molten pig iron comprises a long tank having a cylindrical trunnion at each end which are supported on bearings on a wheel carriage. At least one of the bearings includes a first bearing part which is secured to a bridge support of the undercarriage and has a top spherical support surface which rotatably receives a similar spherical bottom surface of a second lower bearing part. The lower bearing part includes an opened top bearing support surface for rotatably receiving the trunnions of the large tank and it is closed by a bearing cover part. A tilt drive is carried by the trunnions and it includes a drive member having a driving pinion which meshes with a large gear carried on the trunnion shaft. The tilt drive engages against the outer end of the associated second lower bearing part and it includes a torque stay member which is engaged into a receiving member carried on the lower bearing part. The lower bearing part is anchored in position on the bridge member by a centrally disposed king pin.

8 Claims, 3 Drawing Figures

MIXER TYPE CAR FOR TRANSPORTING MOLTEN PIG IRON

BACKGROUND OF THE INVENTION

1. Field of the Invention

This invention relates in general to the construction of vehicles for transporting large containers and in particular to a new and useful mixer-type car for transporting molten pig iron which includes a wheeled undercarriage and a bearing structure for supporting at least one of the trunnions affixed to the respective ends of the tank and which includes a lower bearing part which is provided with a concave spherical surface which engages on a convex spherical surface of a mounting part affixed to the bridge of the undercarriage and wherein the trunnion of the tank carries a tilting drive with a torque stay to anchor a driving motor port of the drive against rotation relative to the trunnion.

2. Description of the Prior Art

At the present time it is known to transport very large tanks on one or more wheeled underarriages which carry bearings for rotatably supporting trunnions carried at each end of the tank. In the known constructions the bearing and the bearing block are secured to a baseplate and one of the baseplates which is at the end of the tank which carries a tilting drive for the pivoting movement of the tank, is provided with a torque stay device for anchoring a driving part of the rotatable tilt drive. In the known construction the mounting requires a very long trunnion and a correspondingly shaped baseplate.

SUMMARY OF THE INVENTION

In accordance with the invention, there is provided an improved construction of bearing mounting for transporting large tanks and to an improved car structure for transporting such tanks which comprises a compact and inexpensive mounting bearing for rotatably supporting each trunnion end of the tank. The bearing support includes a lower bearing mounting part which is secured to a bridge of the wheeled undercarriage and it is provided with a top spherical supporting surface which is engageable with a recessed spherical surface carried on a lower bearing part which rotatably supports one trunnion. The tilting drive which is carried by the trunnion, is arranged so that it will abut against the end of the lower supporting bearing and it advantageously includes a torque stay which is anchored in a receiving bracket carried on this lower bearing. Thus, with the inventive construction there is no need to provide an additional end supporting block for the trunnion. Trunnion bearing which includes the spherical support socket is advantageously closed at its top by a cover bearing of a type which permits it to be bolted over the trunnion received in the lower bearing. The tilting drive comprises a driving motor and a break and it is carried by and supported by the adjacent trunnion of the mixing tank and it is simply propped on the lower support bearing for the trunnion. In consequence, not only the end support bearing block but also the baseplate which was previously required, are no longer necessary. Preferably the propping of the tilt drive is carried out by engagement with the lower bearing part of a two-part trunnion bearing. The entire arrangement permits a construction of a mixer-type car with a compact and inexpensive trunnion suspension of the mixing tank.

In the known mixter-type cars, the thrust forces and buffer shocks acting on the undercarriage are absorbed by the baseplate. According to a development of the invention, the lower part of the trunnion bearing is simply provided with a buffer surface facing a ring or ring segment which is provided on the mixing tank. The thrust forces and the buffer shocks transferred from the undercarriage to the spherical bearing surface are transmitted to the mixing tank. It is useful to provide the buffer surface at the level of the geometrical mean of the spherical bearing surface. With mixing tanks having their opening at the top as usual, a relatively short ring segment is sufficient. However, if it is intended also to move the car with the tank in the turned position, or rotated position, a length of ring segment corresponding to the turning angle of the tank or a full ring may be provided. The ring or ring segment is preferably integral with the end formation of the tank.

In the preferred form the end of the tank is formed with an axially facing end ring surface which abuts against a similar ring surface defined on the fixed lower support bearing. The spherical seating of the lower support bearing permits a construction such that the overall height of the device may be reduced. In addition, a maintenance-free seating is provided with such an arrangement.

Preferably the bearings include replaceable punched half-shell portions made of a material such as sheet steel which together form cage for pressure transferring disks of synthetic material such as polytetrafluoroethylene. These pressure transferring disks are inserted into the bearing interpaces. The reduction of the bearing friction due to the use of these disks makes it possible to drive the tilting drive with a much lower power motor. The punched shells with the disks of synthetic material are provided both between the spherical surfaces of the supporting joint and between the bearing ring formations of the mixing tank ends and the stop disks of the lower bearing.

Accordingly, it is an object of the invention to provide an improved car structure and an improved bearing support structure for very large containers such as molten pig iron transporting containers or mixing tanks which includes a long tank having a cylindrical trunnion at each end which is supported at least on one end on a bearing which includes a lower part which is supported on a spherical mounting surface affixed a bridge of an undercarriage and which forms an end abutment surface for the tilt drive which is carried by the trunnion and which is advantageously provided with means for securing a torque stay of the tilt drive and which is also advantageously provided with an end surface forming an abutment stop or a ring-like end surface of the mixing tank.

A further object of the invention is to provide a car structure for very large containers which are simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
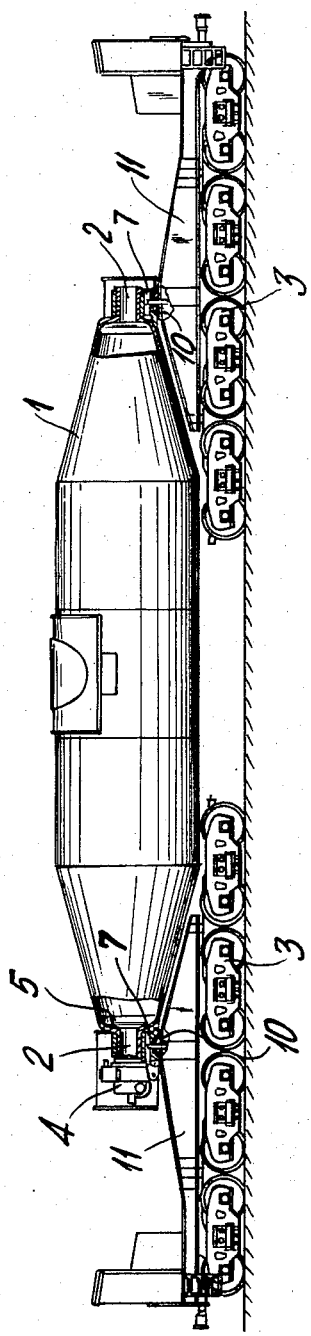
FIG. 1 is a side elevational view of a car structure for transporting very large tanks constructed in accordance with the invention.
Figure 2:
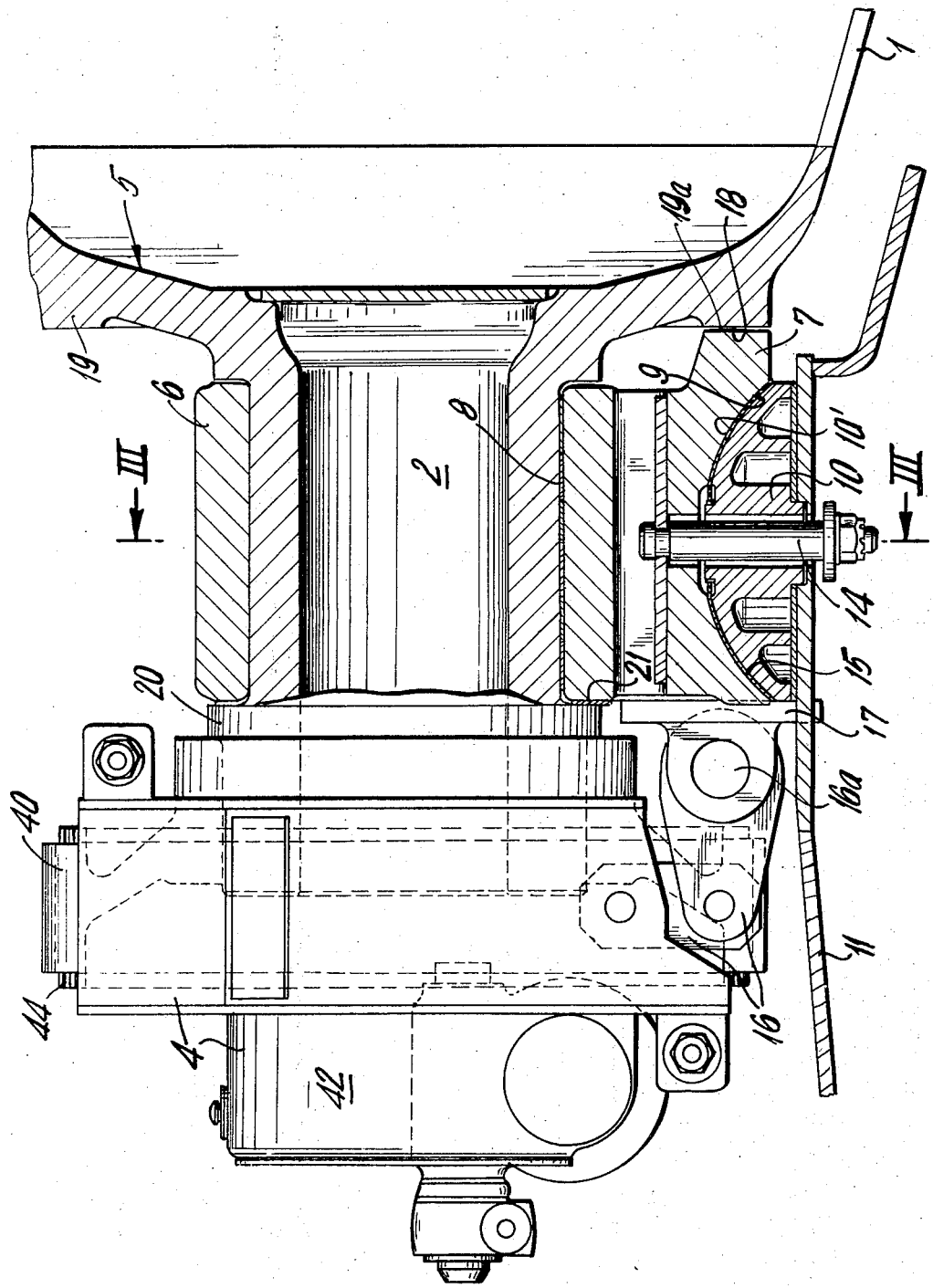
FIG. 2 is an enlarged partial axial sectional view taken along the lines II—II OF FIG. 3.

Referring to the drawings in particular, the invention embodied therein comprises a car structure for the transportation of very large containers such as mixing tanks for molten pig iron which includes a very large mixing tank 1 having a cylindrical bearing trunnion 2,2 at the respective ends which are supported on bearings carried by an under-carriage which comprises two separate wheeled cars 3,3. The mixing tank 1 is rotatably supported by the bearings and for its discharge it may rotated about its longitudinal axis by means of a tilting drive generally designated 4 which is carried on one of the trunnions 2 adjacent one end of the tank 1.

In accordance with the invention, each end of the tank is formed with a bearing support structure generally designated 5 which includes the cylindrical trunnion portions 2 as well as an annular stop surface 19. The trunnion is rotatably supported in bearing means which at this end, comprises a two-part bearing including a top cover part 6 and a lower bearing part 7. Stamped half-shell members 8 of sheet steel are interposed into the bearing joint between the upper and lower parts of the trunnion bearing and they serve as a cage for the pressure transfer disks made of polytetrafluoroethylene.

In accordance with a further feature of the invention, bearing support means includes a mounting socket portion of a lower bearing part 7 having a spherical receiving surface 9 which engages over a spherical mounting surface 10' of a bottom mounting member 10. The surface 9 on the underside of the lower bearing part 7 is formed by machining or it may be cast integrally therewith or separately secured thereto such as by bolts etc. The bearing member 10 is directly secured secured to a bridge 11 formed as an upwardly arched portion of the undercarriage 3 and the construction assures the mobility of the mixer-type car while it passes curves or is subjected to deflections and rotation during movement or during rotation of the mixing tank 1.

Figure 3:
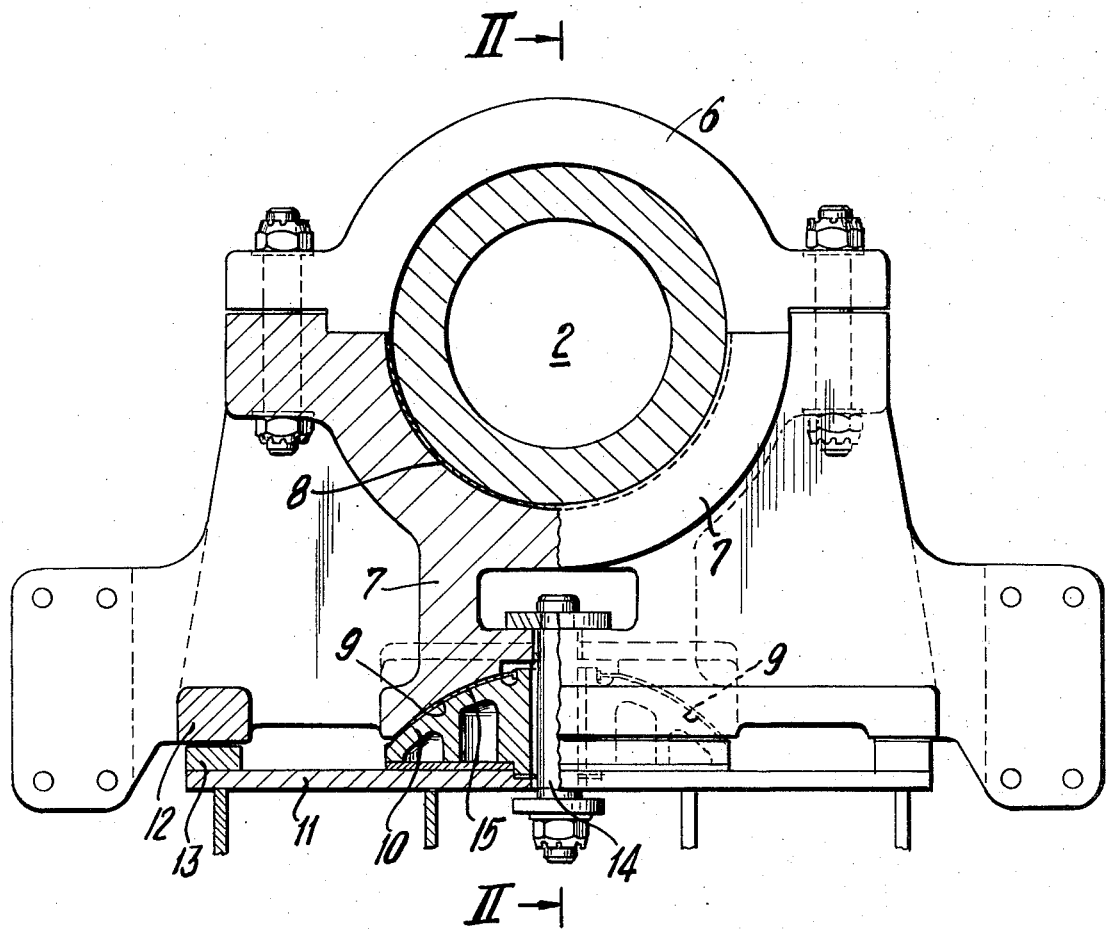
FIG. 3 is an enlarged partial sectional view taken along the line III—III of FIG. 2.

As best seen in FIG. 3, the lower bearing part 7 is provided with longitudinally extending rest surfaces which engage with respective longitudinally extending rest pieces 13,13 provided on respective sides of the bridge 11 of the undercarriage 3. The rest pieces 13 limit the motion of the lower part 7 of the trunnion bearing in a vertical direction. A central king pivot or king pin 14 joins the lower part 7 of the trunnion bearing to the bridge 11 of the undercarriage. The mounting member 10 is engaged with the bridge member 11 and extends between the lower bearing part 7 and the bridge member 11. Maintenance-free insert shells 15 of austenitic steel are interposed between the spherical bearing surface 10 and the spherical bearing surface 9 of the lower part 7 of the trunnion bearing.

In accordance with another feature of the invention, the tilting drive 4 is carried by one of the trunnions 2 and comprises a large gear 40 which is secured to the trunnion for rotation therewith and which is driven by a drive motor 42 driving through intermediate gearing 44. The driving motor 42 together with the intermediate driving gearing is anchored against rotation in respect to the trunnion by torque stays or lugs 16 which are secured such as by bolts 16a to receiving brackets or feet 17 carried upon the lower bearing member 7. The entire tilting drive 4 including the motor 42 and the gearing 44 and a bracket therefor and a brake are supported on the trunnion 2 of the mixing tank 1.

The lower bearing part 7 also includes an end face or annular ring 19 which abuts against a buffer ring surface 18 of the end formation 5 of the mixing tank 1. Instead of a complete annular formation, the surfaces 18 and 19 may be partial ring segments. Preferably a wearing sheet is provided between the ring 19 and the buffer surface 18. During the ride, the buffer surface 18 transfer the thrust forces from the undercarriage 3 to the mixing tank 1. The buffer shocks are absorbed in the same manner. It is useful to provide the buffer surface 18 at the level of the geometrical mean of the spherical bearing surface 10 because in such a case the forces are transferred without the risk of tilting the trunnion bearing.

A stop disk 21 is detachably secured to the front face of the lower part 7 between it and the collar 20 of the trunnion 2. The stop disk 21 comprises two 90° segments and is secured by screws and made of a punched sheet steel in which pressure transferring disks of polytetrafluoroethylene are inserted. This arrangement serves to transfer the tractive forces during the ride.

While a specific embodiment of the invention has been shown and described in detail to illustrate the application of the principles of the invention, it will be understood that the invention may be embodied otherwise without departing from such principles.

What is claimed is:

1. A car structure for very large containers such as for mixing tanks, comprising a long tank having a cylindrical trunnion at each end, a wheeled undercarriage having bearing means at each end rotatably supporting said tank, at least one of said bearing means including a first bearing mounting part secured to said undercarriage and having a top spherical support surface, a second lower bearing part having a bottom spherical support surface engaged on said top spherical support surface and having a top receiving bearing for rotatably supporting a respective one of said trunnions and a tilt drive carried by one of said trunnions and resting against said bearing means, said trunnion including a cylindrical bearing portion adjacent said tank and a collar carried at the outer end of said cylindrical bearing portion, said second lower bearing part including a stop disk located between said collar and said lower bearing part.

2. A car structure, according to claim 1, including a top cover bearing closing said lower bearing part, said tilt drive bearing against said lower bearing part.

3. A car structure, according to claim 1, wherein said lower bearing part includes an end adjacent said mixing tank with a bearing surface facing said mixing tank and adapted to bear against a portion of the exterior of said mixing tank.

4. A car structure, according to claim 3, wherein said end bearing surface of said lower bearing is located at the level of the geometrical mean of said top spherical support surface.

5. A car structure, according to claim 1, wherein said mixing tank includes an end surface adapted to bear against an end of said bearing means.

6. A car structure, according to claim 1, wherein said stop disk is made up of a plurality of segments secured to said second lower bearing part.

7. A car structure, according to claim 1, wherein said stop disk comprises a wearing surface of a material such as sheet steel having punched out portions carrying a synthetic material such as polytetrafluoroethylene.

8. A car structure, according to claim 1, wherein said tilt drive includes a driving motor, a large size gear fixed to said trunnion, and drive pinion means between said driving motor and said large size gear for rotating said gear and said trunnion, said tilt drive having a torque stay comprising a lug, said second lower bearing part having a receiving bracket with the lug engaged therein and anchoring said tilt drive drive motor and said pinion gearing against rotation in respect to said large gear and said trunnion.

* * * * *